United States Patent [19]

Bühler et al.

[11] Patent Number: 4,484,992
[45] Date of Patent: Nov. 27, 1984

[54] PROCESS FOR THE PRODUCTION OF HYDROGEN BY MEANS OF HETEROGENEOUS PHOTOREDOX CATALYSIS

[75] Inventors: Niklaus Bühler, Rheinfelden; Jean F. Reber, Riehen; Kurt Meier, Allschwil; Milos Rusek, Binningen, all of Switzerland

[73] Assignee: Ciba-Geigy Corporation, Ardsley, N.Y.

[21] Appl. No.: 342,615

[22] Filed: Jan. 25, 1982

[30] Foreign Application Priority Data

Feb. 4, 1981 [CH] Switzerland ............... 741/81

[51] Int. Cl.$^3$ ............................................ B01J 19/12
[52] U.S. Cl. ........................... 204/157.1 R; 427/54.1; 429/111; 502/215; 502/222; 502/223
[58] Field of Search ............... 204/157.1 W, 157.1 R; 427/53.1, 54.1, 92, 125; 252/439, 472; 502/215, 222, 223, 325

[56] References Cited

U.S. PATENT DOCUMENTS

| | | | |
|---|---|---|---|
| 3,969,495 | 7/1976 | Dreyfuss | 423/648 |
| 4,045,315 | 8/1977 | Fletcher | 204/157.1 R |
| 4,094,751 | 6/1978 | Nozik . | |
| 4,105,517 | 8/1978 | Frosch | 204/157.1 R |
| 4,264,421 | 4/1981 | Bard et al. | 204/157.1 R |

FOREIGN PATENT DOCUMENTS 55944 10/1968 Poland ............... 502/325

OTHER PUBLICATIONS

Ellis et al., JACS, vol. 99, pp. 2839–2848, (1977).
Frank et al., J. Phys. Chem., vol. 81, pp. 1484–1488, (1977).
Kogo et al., J. Phys. Chem., vol. 84, pp. 1705–1710, (1980).
Kraeutler et al., JACS, vol. 100, pp. 2239–2240 and 5985–5992, (1978).
Wrighton et al., JACS, vol. 98, pp. 2774–2779, (1976).
Kawai, Nature, vol. 282, pp. 283–284, (1979).
Kawai et al., Nature, vol. 286, pp. 474–476, (1980).
Kawai et al., 7th Int. Cong. on Calalysis (Tokyo), pp. B38-1 to B38-10, (1980).
Kiwi et al., Angew. Chem., vol. 92, pp. 663–665, (1980).
Borgarello et al., Nature, vol. 289, No. 5794, pp. 158–160, (1/15/81).
Wrighton, Accounts of Chemical Research, vol. 12, pp. 303–310, (1979).
Maruska et al., Solar Energy, vol. 20, pp. 443–458, (1978).
Bard, Science, vol. 207, No. 4427, pp. 139–144, (1980).
Horowitz et al., Revue Phys. Appl., vol. 15, pp. 463–476, (1980).
Inoue et al., J. Electrochem. Soc., vol. 124, pp. 719–722, (1977).
Wrighton et al., Proc. Nat. Acad. Sci., vol. 72, pp. 1518–1522, (1975).

Primary Examiner—Howard S. Williams
Attorney, Agent, or Firm—Michael W. Glynn

[57] ABSTRACT

A process is described for the selective production of hydrogen by means of heterogeneous photoredox catalysis, in which mixtures of water and alkali metal sulfites or sulfides, alkaline earth metal sulfites or sulfides or ammonium sulfites or sulfides are reacted under the action of light in a suspension of a cadmium sulfide, cadmium sulfoselenide or titanium dioxide/semiconductor powder which is at least partially coated with Cu, Cr, Ni, Co or a noble metal or mixtures thereof. The catalysts which can be employed in this process (coated semiconductor powders) are in some cases novel.

8 Claims, No Drawings

PROCESS FOR THE PRODUCTION OF HYDROGEN BY MEANS OF HETEROGENEOUS PHOTOREDOX CATALYSIS

The invention relates to a process for the production of hydrogen by means of heterogeneous photoredox catalysis, novel catalysts which can be employed in the process and processes for their preparation.

Various heterogeneous photocatalytic and photosynthetic processes, for example for the preparation of fuels, such as hydrogen or methanol, in which n-semiconductor or p-semiconductor powders are used as photoanodes or photocathodes together with metal electrodes, preferably platinum electrodes (so-called semiconductor/solution systems), are known from the literature. These are, in general, two-cell systems. Examples of suitable semiconductors are ZnO, $TiO_2$, CdO, CdS, CdSe, CdTe, GaP, $Ag_2S$, $SrTiO_3$, $SnO_2$, $Fe_2O_3$, $Fe_3O_4$ and $WO_3$. Oxygen-free coloured n-semiconductors, such as CdS and CdSe, are not sufficiently stable in an aqueous medium, since they undergo photoanodic decomposition under the action of light. They must therefore be stabilised by incorporating suitable redox systems, such as $S^{2-}/S_x^{2-}$, $SO_3^{2-}/SO_4^{2-}$ or $S_2O_3^{2-}/S_4O_6^{2-}$, Oxygen-free coloured n-semiconductors, however, are of particular industrial interest, since they are capable of absorbing a considerable fraction of sunlight. Systems of the type mentioned can be used, for example, for the photoelectrolysis of water into hydrogen and oxygen, for the oxidation of cyanides or sulfites to cyanates or sulfates, respectively, or for obtaining methanol from $CO_2$, or ammonia from $N_2$. In the sulfite oxidation, the oxygen is reduced at the cathode.

It has also been suggested to use $TiO_2$ coated with platinum or platinised $SrTiO_3$ as a one-cell system for the decarboxylation of aliphatic monocarboxylic acids to give alkanes and $CO_2$ (the photo-Kolbe reaction), the photoelectrolysis of water or the oxidation of cyanides to cyanates with simultaneous reduction of oxygen. Compared with corresponding two-cell systems, the use of platinumcoated $TiO_2$ powder for the decarboxylation of aliphatic monocarboxylic acids enables the efficiency of the photoreaction to be increased. Other n-semiconductors which are coated with noble metals, such as cadmium sulfide coated with platinum, have neither been described previously, nor are they suitable, for such decarboxylation reactions. In the said decarboxylation of aliphatic monocarboxylic acids, the main products formed are alkanes and $CO_2$ in a ratio of approx. 1:1, but only insignificant amounts of hydrogen are formed, since a considerable fraction of the hydrogen radicals formed at the cathode recombines with the alkyl radicals formed at the anode to give alkanes. [Compare, for example, Accounts of Chemical Research, 12, 303 (1979); Solar Energy, 20, 443 (1978); Science, 207, 139 (1980); JACS, 100, 2239 and 3985 (1978); JACS; 98, 2774 (1978); JACS, 99, 2839 (1977); J. Phys. Chem., 81, 1484 (1977); J. Phys. Chem., 84, 1705 (1980); Revue Phys. Appl., 15, 463 (1980); J. Electrochem. Soc., 124, 719 (1977) and Proc. Nat. Acad. Sci., 72, 1518 (1975)].

Finally, it is known that mixtures of water and carbon or mixtures of water and carbohydrates, such as cellulose, sugar and starch, can be converted into hydrogen, mixed with $CO_2$ and CO, in the presence of pulverulent $RuO_2/TiO_2/Pt$ catalysts under the action of light. In this respect, however, the conversion of carbohydrates can only be effected at a low efficiency using visible light (sunlight). Hydrogen can also be obtained photocatalytically by scission of water in the presence of semiconductor powders of the type mentioned above, such as $TiO_2$, in the presence of tertiary amines, such as ethylenediaminetetraacetic acid (EDTA) or triethylamine as reducing agents. However, the efficiency of this system is relatively low and the reducing agent is irreversibly oxidised in this redox reaction to give valueless products which cannot be utilised further [compare, for example, Nature, 282, 283 (1979) and 286, 474 (1980) and 7th International Congress on Catalysis, Tokyo, 3./4.7.1980, Preprint].

Hydrogen can also be produced from water under the action of visible light by reducing methyl viologen with ruthenium tris-bipyridyl as sensitiser in the presence of platinum-doped $TiO_2/RuO_2$ particles and in the presence of EDTA. In this reaction the EDTA is—as already mentioned, oxidised irreversibly [compare Angew. Chem., 92, 663 (1980)].

These previously known processes have hitherto achieved no industrial importance.

The subject of the invention is a process for the selective production of hydrogen by means of heterogeneous photoredox catalysis by reacting mixtures of water and alkali metal sulfites or sulfides, alkaline earth metal sulfites or sulfides or ammonium sulfites or sulfides under the action of light in a suspension of a cadmium sulfide/semiconductor, cadmium sulfoselenide/semiconductor or titanium dioxide/semiconductor powder which is at least partially coated with Cu, Cr, Ni, Co or a noble metal or mixtures thereof.

The reaction can, for example, be illustrated by means of the following equation:

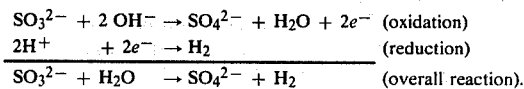

The process according to the invention is distinguished by its simplicity and good efficiency, even if titanium dioxide coated with Cu, Cr, Ni, Co or noble metals is used, although the latter is not generally considered to be sufficient in the conduction band level for the evolution of hydrogen [compare, for example, Solar Energy, 20, 443 (1978), Accounts of Chemical Research, 12, 303 (1979) and Proc. Nat. Acad. Sci, 72, 1518 (1975)]. The starting materials to be employed are readily accessible and cheap and enable hydrogen to be produced efficiently under stable conditions, combined with a useful and advantageous oxidative process. In this process the alkali metal, alkaline earth metal or ammonium sulfites are oxidised to the sulfates (for example calcium sulfate), which are less harmful from an ecological point of view and can, if desired, be re-utilised, and the sulfides are oxidised to sulfur or polysulfides. The reducing agents themselves can be obtained in a simple manner which is known per se from industrial wastes which are produced in large quantities, for example from sulfite waste liquors, such as are produced in the paper industry, by utilising the sulfur or industrial waste gases containing $SO_2$ which are formed in large quantities in the washing of coal and the refining of petroleum, from sulfide effluents in vat dyeing or from the sulfur dioxide formed in coal gasification processes. It has previously been necessary to remove this sulfur dioxide from coke-oven gases by special desulfurisation processes, for example by the Stretford process [compare Hydrocarbon Processing and Petroleum Refiner, 40, 141-146 (1961)] by catalytic reduction of sulfur dioxide to give sulfur, in which case the catalyst which becomes oxidised in the process must be regenerated again. In the so-called catasulf process [compare, for example, Chem. Fabrik II (1/2), 10(1938) and German Patent Specifications Nos. 510,488, 576,137 and 634,427] the sulfur dioxide is reacted with the ammonia which is also present in coke-oven gas to give ammonium sulfite. The latter is converted into ammonium sulfate (fertiliser) and sulfur in an expensive process using sulfuric acid at elevated temperatures (approx. 150° C.). In the process according to the invention, ammonium sulfite can be converted into ammonium sulfate in a considerably simpler manner.

Examples of suitable materials for suspending the catalysts are water, alkanols having up to 6 C atoms, such as methanol, ethanol, propanol, isopropanol, butanols and hexanols, aliphatic or cyclic ethers, such as diethyl ether, diisopropyl ether, tetrahydrofuran and dioxane, cellosolve or mixtures of water with alcohols, such as methanol and ethanol, or with tetrahydrofuran, dioxane or cellosolve. Water is used preferably.

Suitable alkali metal sulfites or sulfides or alkaline earth metal sulfites or sulfides are Na sulfite or sulfide, K sulfite or sulfide, Li sulfite or sulfide, Mg sulfite or sulfide, Ca sulfite or sulfide and Ba sulfite or sulfide. It is preferable to use an alkali metal sulfite or sulfide or ammonium sulfite or sulfide, particularly sodium sulfite or ammonium sulfite.

The reaction temperatures are, in general, between 20° C. and the boiling point of the suspending agent used. The reaction is preferably carried out at a temperature between 40° and 80° C.

Examples of suitable noble metals are Ru, Os, Rh, Ir, Pd, Pt, Ag or Au. Rhodium, nickel, osmium, ruthenium and nickel/rhodium and silver/platinum mixtures are preferred; platinum is particularly preferred.

The proportion of metal on the semiconductor powder is advantageously between 0.001 and 10% by weight, preferably between 0.05 and 8% by weight, relative to the weight of the semiconductor powder.

The specific surface area of the semiconductor powders can vary within wide limits and depends essentially on the nature of the semiconductor. Cadmium sulfide and cadmium sulfoselenide preferably have a specific surface area of 0.1 to 20 m$^2$/g, preferably an area less than 7 m$^2$/g and, in particular, less than 1.5 m$^2$/g, while in the case of titanium dioxide the specific surface area is preferably between 1 and 250 m$^2$/g and is, in particular, approx. 10 m$^2$/g.

The cadmium sulfide used is advantageously cadmium sulfide of electronic quality, as it is called, in which up to 1% of the sulfur has been replaced by oxygen, and which has a low chlorine content, preferably less than 40 ppm. In the case of titanium dioxide, the technical quality (purity approx. 95%) is generally adequate. The cadmium sulfoselenide [CdS(Se)] used is preferably cadmium sulfoselenide containing 10 to 60% by weight of selenium.

The metal particles on the semiconductor powder preferably have a particle size of 10 Å to 1,000 Å. In the case of titanium dioxide coated with platinum, it has proved particularly advantageous for the particle size of the platinum to be 10 to 150 Å.

The catalysts are advantageously employed in amounts of 0.05 to 5% by weight, preferably 0.4 to 2.0% by weight, relative to the volume of the reaction (reactants + suspending agent).

In the case of titanium dioxide catalysts, the anatase modification is generally preferred. Preferred catalysts are cadmium sulfoselenide/semiconductor or titanium dioxide (anatase modification)/semiconductor powders and, in particular, cadmium sulfide/semiconductor powders which are at least partially coated with rhodium, nickel, osmium, ruthenium or nickel/rhodium or silver/platinum mixtures. Cadmium sulfide/semiconductor, cadmium sulfoselenide/semiconductor or titanium dioxide (anatase modification)/semiconductor powders which are at least partially coated with platinum are very particularly preferred.

The light source employed for the redox reaction according to the invention can be any desired light having a wavelength, depending on the semiconductor, between approx. 200 and 650 nm. Suitable sources of light are sunlight, particularly if cadmium catalysts of the type defined are used, or, for example, high-pressure mercury lamps, xenon vapour lamps, mercury-xenon lamps, low-pressure and medium-pressure mercury lamps, halogen lamps, tungsten lamps or D$_2$ lamps, which can be doped with metal atoms. The wavelengths for cadmium sulfide and cadmium sulfoselenide catalysts are generally up to approx. 600 nm, and for titanium dioxide catalysts up to approx. 400 nm.

The quantitative determination of the hydrogen evolved in the reaction can be carried out in a manner known per se, for example by the hydrogenation of suitable aromatic compounds.

The sulfates or polysulfides or the sulfur formed can be separated off in a customary manner, for example by precipitation, if desired in the form of sparingly soluble salts, such as alkaline earth metal salts. The sulfur can be isolated, for example, by acidifying the reaction solution.

The catalysts to be employed in accordance with the invention can be prepared, for example, as follows:

1. By photocatalytic deposition of the metals on the semiconductor powders, in which case the semiconductor powder is suspended, advantageously with the addition of acid or salts thereof, in an aqueous solution or suspension of a suitable metal compound or a mixture of suitable metal compounds, if desired in the presence of a buffer, such as sodium acetate, potassium acetate or sodium formate (pH preferably approx. 1.0 to 9.0), and is then exposed to light, preferably at a temperature between 40° and 60° C. In this exposure to light, light sources having a high UV-C content (compare Houben-Weyl, Band Photochemie (Photochemistry Volume) I, page 42), for example high-pressure mercury vapour lamps, must be employed for coating cadmium sulfide/semiconductor and cadmium sulfoselenide/semiconductor powders. Any desired light sources of the type previously mentioned can be used for titanium dioxide catalysts.

Examples of suitable acids are compounds of the formula I and II

R—COOH     (I)

HOOC—R'—COOH     (II)

Examples of suitable salts thereof are the corresponding sodium, potassium, lithium and ammonium salts. In these formulae, R is straight-chain or branched C$_{1-8}$-alkyl, especially C$_{1-4}$-alkyl, C$_{3-8}$-cycloalkyl, —CH$_2$X, —CHX$_2$ or —CX$_3$ in which X is fluorine or bromine and especially chlorine, —(CH$_2$)$_n$—OH, —(CH$_2$)$_n$—O—C$_{1-8}$-alkyl, especially —(CH$_2$)$_n$—O—C$_{1-4}$—alkyl or —(CH$_2$)$_n$—O—phenyl in which n is 1 to 8 and especially 1 to 4, phenyl, naphthyl or benzyl, and R' is —C$_m$H$_{2m}$— in which m is 1 to 8, especially 1 to 6. The following may be mentioned as examples of such acids: formic acid, acetic acid, propionic acid, butyric acid, isobutyric acid, 2-methylbutyric acid, pivalic acid, 3,3-dimethylbutyric acid, caproic acid, 2-methylhexanoic acid, oenanthic acid, caprylic acid, cyclopropanecarboxylic acid, cyclopentanecarboxylic acid, cyclohexanecarboxylic acid, chloroacetic acid, bromoacetic acid, dichloroacetic acid, trichloroacetic acid, trifluoroacetic acid, glycollic acid, methoxyacetic acid, ethoxyacetic acid, isopropoxyacetic acid, n-butoxyacetic acid, n-hexyloxyacetic acid, methoxypropionic acid, ethoxyacetic acid, methoxybutyric acid, phenoxyacetic acid, phenoxypropionic acid, phenoxybutyric acid, benzoic acid, naphthoic acid and benzyl formate; malonic acid, succinic acid, methylmalonic acid, glutaric acid, methylsuccinic acid, adipic acid, 2,2-dimethylsuccinic acid and pimelic acid. Formic acid, chloroacetic acid or glycollic acid and, in particular, acetic acid are used particularly preferentially.

2. By electrolytic deposition of the metals on the semiconductor powders in accordance with the process described in J. Phys. Chem. 84, 1705 (1980).

3. By hydrogenolytic deposition of the metals on the semiconductor powders. In this case the semiconductor powder is advantageously impregnated with an aqueous solution of a suitable metal compound or a mixture of suitable metal compounds, if desired with the addition of an acid, and is then dried at an elevated temperature, preferably between 60° and 160° C., after which the metal compound is reduced with H$_2$. The reduction is preferably carried out at temperatures between 150° and 400° C. Acids which can be used are inorganic acids as well as organic acids, for example organic acids of the type mentioned under 1. HCl and acetic acid are preferred.

4. By reductive preparation of a colloid, for example in accordance with the process described in Angew. Chem., 92, 663 (1980). In this case the metal compound is first reduced and then mixed with the semiconductor powder.

5. By treating the semiconductor powders with the vapours of metals, especially treating titanium dioxide, cadmium sulfide or cadmium sulfoselenide powders with the vapours of platinum, from high-melting, heated metal wires, especially tungsten, tantalum, niobium or osmium wires, for example at 10 V/60 amp.

6. By irradiating an aqueous suspension of the semiconductor powder and a metal compound with UV light, preferably using a high-pressure mercurcy vapour lamp at temperatures between 40° and 80° C., or using other lamps having a high UV-C content.

The processes mentioned above can be used to deposit various metals onto the same semiconductor powder, and the various methods can be applied successively in any desired sequence. Thus the various metals can be deposited simultaneously, for example photocatalytically, electrolytically or hydrogenolytically, or successively, in any desired sequence, photocatalytically, electrolytically and hydrogenolytically.

In the said processes it can also be advantageous to employ cadmium sulfide or cadmium sulfoselenide which has been pretreated in an aqueous medium with the addition of an acid or salts thereof and has been exposed to light sources having a high UV-C content, or preferably to subject the cadmium sulfide/semiconductor or cadmium sulfoselenide/semiconductor powders which have been coated with metals by the said processes to an after-treatment by suspending them in an aqueous medium, with the addition of an acid or salts thereof, and again irradiating them with light having a high UV-C content. The pH of the aqueous medium here is advantageously between about 1.0 and 9.0, and it is advantageous concomitantly to use buffers, such as sodium acetate and potassium acetate or sodium formate, in order to adjust the pH to the desired value. Examples of suitable acids or salts thereof are those of the type mentioned under 1.

Prior to the deposition of metal, the semiconductor powders can, if necessary, be purified by reduction. It is preferable to prepare the catalyst in accordance with processes 1, 3, 4 and 6, particularly processes 1 and 3, cadmium sulfide/semiconductor and cadmium sulfoselenide/semiconductor powders preferably being after-treated in an aqueous medium with the addition of an acid or salts thereof and being irradiated again, as described above.

Suitable metal compounds for the above reactions 1-4 and 6 are, in particular, simple and complex salts, particularly ammonium hexahalogen-metallates or tetrahalogen-metallates and alkali metal hexahalogen-metallates or tetrahalogen-metallates, and also halides, nitrates, acetates and cyanides. Examples of suitable metal compounds are hexachloroplatinic acid [chloroplatinic (IV) acid], hexabromoplatinic acid and hydrates and salts thereof, such as ammonium hexachloroplatinate (IV); ammonium tetrachloroplatinate (II), platinum (IV) bromide, platinum (II) chloride, platinum (IV) chloride and potassium tetrachloroplatinate (II); iridium (III) chloride, chloroiridic (IV) acid hexahydrate and ammonium hexachloroiridate (IV); gold (III) chloride, bromide and iodide, gold (I) cyanide and gold (I) acetate; palladium chloride or iodide and palladium acetate, cyanide and nitrate; ruthenium (III) chloride hydrate; silver acetate and nitrate; rhodium acetate, rhodium chloride and ammonium hexachloroosmate and salts thereof; nickel chloride, nickel acetate, chromium chloride, cobalt chloride, cobalt acetate, copper chloride and copper acetate. Hexachloroplatinic acid hydrate, rhodium (III) chloride, nickel (II) chloride, ammonium hexachloroosmate, ruthenium (III) chloride hydrate, nickel (II) chloride/rhodium (III) chloride mixtures and silver acetate/hexachloroplatinic acid hydrate mixtures are preferred.

Hexachloroplatinic acid hydrate is particularly preferred.

The catalysts to be employed in the process according to the invention are novel, with the exception of the titanium dioxide powder coated with platinum as described in JACS, 100, 4317 (1978) or J. Phys. Chem., 84, 1705 (1980). The invention thus relates also to novel cadmium sulfide/semiconductor, cadmium sulfoselenide/semiconductor and titanium dioxide/semiconductor powders which are at least partially coated with Cu, Cr, Ni, Co or noble metals or mixtures thereof, with the exception of platinum-coated titanium dioxide powder. Cadmium sulfoselenide/semiconductor or titanium dioxide (anatase modification)/semiconductor powders and, in particular, cadmium sulfide/semiconductor powders which are at least partially coated with rhodium, nickel, osmium, ruthenium or nickel/rhodium or silver/platinum mixtures are preferred. Cadmium sulfide/semiconductor and cadmium sulfoselenide semiconductor powders which have been at least partially coated with platinum are particularly preferred. In other respects the preferences mentioned previously in the explanation of the process are applicable.

EXAMPLE 1: CADMIUM SULFIDE COATED WITH PLATINUM 0.25 g of hexachloroplatinic acid hydrate (corresponding to a platinum content of 0.1 g) is dissolved in 3 ml of 1N HCl and the solution is made up to a volume of 80 ml with distilled water. The resulting yellow solution is neutralised by adding concentrated aqueous NaOH solution dropwise and its pH is then adjusted to 4 with acetic acid. 10 g of cadmium sulfide (electronic quality; specific surface area 0.25 m$^2$/g) are suspended in this solution, and the solution is degassed with nitrogen for 30 minutes at 60° C. It is then exposed to light for 30 minutes at 60° C. in a photoreactor equipped with a water-cooled quartz glass dip tube and a 150 watt high-pressure mercury vapour lamp. The resulting green-grey suspension is filtered and the material on the filter is washed with distilled water and dried at 120° C./13,000 Pa. Platinum content 0.8% by weight.

EXAMPLE 2: CADMIUM SULFIDE COATED WITH PLATINUM 2 g of hexachloroplatinic acid hydrate (corresponding to a platinum content of 0.5 g) are dissolved in 12 ml of dilute HCl and the solution is then added to 49.5 g of cadmium sulfide (electronic quality; specific surface area 0.25 m$^2$/g) and the product is thoroughly mixed. The impregnated substance thus obtained is dried for 2.5 hours at 80° C./2,000–2,700 Pa and then for a further 2.5 hours at 150°–160° C. in a heated desiccator. The product is then treated with a stream of H$_2$ for 3 hours at 200° C. in a rotating 250 ml flask of a rotary evaporator. CdS coated with platinum is obtained in the form of a greenish powder; platinum content 1% by weight. Examples 3–10: TiO$_2$ coated with platinum

EXAMPLE 3

The procedure described in Example 1 is repeated, except that 10 g of TiO$_2$ (anatase; specific surface area 8 m$^2$/g) are used and the product is exposed for 6 hours. After working up, a greyish powder containing 0.84% by weight of platinum is obtained.

EXAMPLE 4

Example 3 is repeated, except that 0.05 g of hexachloroplatinic acid hydrate is used. TiO$_2$ coated with platinum is obtained in the form of a slightly greyish powder containing 0.17% by weight of platinum.

EXAMPLE 5

Example 3 is repeated, except that 0.0125 g of hexachloroplatinic acid hydrate is used. Platinum-coated TiO$_2$ is obtained in the form of a slightly greyish powder containing 0.044% by weight of platinum.

EXAMPLE 6

Example 3 is repeated, except that 2.5 g of hexachloroplatinic acid hydrate is used. A dark grey powder containing 6.92% by weight of Pt is obtained.

EXAMPLE 7

Example 3 is repeated, except that 10 g of the rutile modification of TiO$_2$ (specific surface area 8 m$^2$/g) are used. An analogous is obtained.

EXAMPLE 8

49.5 g of TiO$_2$ (anatase, specific surface area 8 m$^2$/g) are added to a solution of 2 g of hexachloroplatinic acid hydrate (corresponding to 0.8 g of platinum) in 12 ml of dilute hydrochloric acid and the product is mixed carefully. The impregnated substance thus obtained is dried first for 2.5 hours at 80° C./2,000–2,700 Pa and then for 2.5 hours at 150°–160° C. in a heated desiccator. The reduction in a stream of H$_2$ is carried out for 3 hours at 200° C. in a rotating flask (250 ml) of a rotary evaporator. A greyish powder containing 1% by weight of platinum is obtained.

EXAMPLE 9

Example 8 is repeated, except that 0.013 g of hexachloroplatinic acid hydrate is used. TiO$_2$ coated with platinum and containing 0.05% by weight of platinum is obtained.

EXAMPLE 10

Example 3 is repeated, except that 0.25 g of hexachloroplatinic acid hydrate and titanium dioxide (anatase) having a specific area of 10 m$^2$/g are used. Platinum-coated TiO$_2$ containing 1% by weight of platinum is obtained.

EXAMPLE 11: CADMIUM SULFIDE PLATED WITH GOLD

Cadmium sulfide of the same quality and of the same specific surface area as indicated in Example 1 is coated with gold by the methods described in Examples 1 and 2, using 0.3 g of gold (III) chloride. The gold content of the resulting green-yellow powder is 1.33% by weight.

EXAMPLE 12: TiO$_2$ COATED WITH GOLD

TiO$_2$ (anatase, specific surface area 8 m$^2$/g) is coated with gold by the method described in Example 3 [0.208 g of gold (III) chloride]. A yellowish powder containing 1.0% by weight of gold is obtained.

EXAMPLE 13

10 g of TiO$_2$ (anatase, specific surface area 10 m$^2$/g), together with 0.2 g of hexachloroplatinic acid hydrate (approx. 40% by weight of Pt), in 90 ml of water at 60° C. in a photoreactor equipped with a 125 watt high-pressure mercury vapour lamp in a quartz dip shaft, are degassed with nitrogen for half an hour and then exposed to light at this temperature for 5 hours under a gentle stream of nitrogen. In the course of this, the suspension, which was originally white, slowly becomes grey. The suspension is filtered and the material on the filter is washed with water and dried for 24 hours in a drying cabinet at 120° C. 9.03 g of a grey powder containing 0.6% by weight of Pt are obtained.

EXAMPLE 14: CADMIUM SULFIDE COATED WITH PLATINUM 0.4 g of hexachloroplatinic acid hydrate (platinum content 0.16 g) is dissolved in 77.3 ml of water and 6 ml of 0.1N hydrochloric acid and the pH of the solution is adjusted to 7 with concentrated NaOH solution. 2.0 g of potassium acetate and 5 ml of a 5% aqueous solution of $Cd(NO_3)_2 \cdot 4H_2O$ are added and the pH is adjusted to 4.5 by means of 1.7 ml of 96% acetic acid. 10 g of CdS (electronic quality, specific surface area 0.64 m$^2$/g) are then added, and the suspension is degassed for 30 minutes at 60° C. and is then exposed for 30 minutes with a 125 watt high-pressure mercury vapour lamp applied through a water-cooled quartz finger. The resulting green-grey suspension is filtered and the material on the filter is washed with distilled water and dried in a drying cabinet at 60° C./13,000 Pa. Platinum content 1.1% by weight.

EXAMPLE 15

Example 14 is repeated, using 10 g of cadmium sulfoselenide (60 mol % of CdSe; specific surface area 1.5 m$^2$/g). The resulting yellow-green powder has a Pt content of 1.2% by weight.

EXAMPLE 16

82.3 ml of water and 6 ml of 0.1N hydrochloric acid are adjusted to pH 7 with concentrated aqueous NaOH solution, 2.0 g of potassium acetate are added and the pH is adjusted to 4.5 by means of 1.7 ml of 96% acetic acid. 10 g of the platinum-coated cadmium sulfide obtained in accordance with Example 2 are then added. The suspension is degassed with argon for 30 minutes at 60° C. and is then irradiated for 30 minutes with a 125 watt high-pressure mercury vapour lamp applied through a water-cooled quartz finger. The resulting grey-green suspension is filtered and the material on the filter is washed with distilled water and dried in a drying cabinet at 60° C./13,000 Pa. Platinum content of the resulting powder: 1.0% by weight.

EXAMPLE 17

82.3 ml of water and 6 ml of 0.1N hydrochloric acid are adjusted to pH 7 with concentrated aqueous NaOH solution, and 3.7 g of chloroacetic acid are added. The pH of the solution is then adjusted to 3.0 with 1N aqueous NaOH solution. 10 g of a platinum-coated cadmium sulfide prepared analogously to Example 2 (Pt content 1% by weight) are added and the suspension is degassed with argon for 30 minutes at 60° C. and is exposed for 30 minutes with a 125 watt high-pressure mercury vapour lamp applied through a water-cooled quartz dip finger. The resulting green-grey suspension is filtered and the material on the filter is washed with distilled water and dried in a drying cabinet at 60° C./13,000 Pa. Platinum content of the resulting powder: 1.0% by weight.

EXAMPLE 18

Example 17 is repeated, except that 3.7 g of glycollic acid are used instead of chloroacetic acid. The pH of the solution is adjusted to 3.5 with 1N aqueous NaOH solution. Platinum content of the resulting powder: 1.0% by weight.

EXAMPLE 19

Example 16 is repeated, except that 1.7 ml of formic acid and 2 g of sodium formate are used instead of acetic acid and potassium acetate. This results in a pH of 3.8. Platinum content of the resulting powder: 1.0% by weight.

EXAMPLE 20: CADMIUM SULFIDE COATED WITH PALLADIUM

Example 14 is repeated, except that 0.4 g of palladium acetate is used instead of hexachloroplatinic acid hydrate. A brown-black powder containing 2.0% by weight of Pd is obtained.

EXAMPLE 21: CADMIUM SULFIDE COATED WITH SILVER 0.4 g of silver nitrate is dissolved in 77.3 ml of water, 2 g of potassium acetate are added and the pH of the mixture is adjusted to 4.5 with acetic acid. The further treatment is carried out as described in Example 14. A green-grey powder containing 2.6% by weight of silver is obtained.

EXAMPLE 22: CADMIUM SULFIDE COATED WITH RHODIUM 0.8 g of rhodium (III) chloride is dissolved in 20 ml of water. 10 g of cadmium sulfide (electronic quality, specific surface area 0.64 m$^2$/g) are then added and the product is thoroughly mixed. The water is removed at 80° C. under a waterpump vacuum and the impregnated substance obtained is dried at 60° C. for 2 hours in a heated desiccator. The product is then treated with a stream of H$_2$ in a quartz tube for 2 hours at 200° C. Cadmium sulfide coated with rhodium is obtained in the form of a green-black powder; Rh content 4% by weight.

EXAMPLE 23: CADMIUM SULFIDE COATED WITH IRIDIUM

Example 22 is repeated, except that 0.8 g of iridium (III) chloride is used. Cadmium sulfide coated with iridium is obtained in the form of a black powder; Ir content 4% by weight.

EXAMPLE 24: CADMIUM SULFIDE COATED WITH NICKEL

Example 22 is repeated, except that 0.8 g of nickel (II) chloride is used and the treatment with a stream of H$_2$ is carried out at 300° C. Cadmium sulfide coated with nickel is obtained in the form of a black-green powder; Ni content 1.15% by weight.

EXAMPLE 25: CADMIUM SULFIDE COATED WITH SILVER

Example 22 is repeated, except that 0.8 g of silver nitrate is used. Cadmium sulfide coated with silver is obtained in the form of a black-green powder; Ag content 6.7% by weight.

EXAMPLE 26: CADMIUM SULFIDE COATED WITH OSMIUM

Example 22 is repeated, except that 0.8 g of ammonium hexachloroosmate is used. Cadmium sulfide coated with osmium is obtained in the form of a black-green powder; osmium content 5% by weight.

EXAMPLE 27: CADMIUM SULFIDE COATED WITH RUTHENIUM

Example 22 is repeated, except that 0.8 g of ruthenium (III) chloride is used. Cadmium sulfide coated with ruthenium is obtained in the form of a black-green powder; ruthenium content 4.5% by weight.

The coated cadmium sulfide powders obtained in accordance with Examples 22 to 27 are then subjected to after-treatment as described in Example 16.

EXAMPLE 28: CADMIUM SULFIDE COATED WITH NICKEL AND RHODIUM

Example 22 is repeated, except that a mixture of 0.1 g of rhodium (III) chloride and 0.7 g of nickel (II) chloride is used and the reaction temperature is 300° C. Cadmium sulfide coated with nickel and rhodium is obtained in the form of a black-green powder; nickel content 1.2% by weight; rhodium content 0.5% by weight.

EXAMPLE 29

20 g of the cadmium sulfide obtained in accordance with Example 25, coated with 6.7% by weight of silver, are coated with platinum analogously to the conditions of Example 14; Pt content 0.5% by weight.

EXAMPLE 30

10 g of cadmium sulfide (electronic quality, specific surface area 0.64 m$^2$/g) are treated analogously to Example 16. A yellow powder having a specific surface area of 1.2 m$^2$/g is obtained. This powder is then coated with platinum analogously to Example 14. Cadmium sulfide coated with platinum is obtained in the form of a green powder; platinum content 1.0% by weight.

EXAMPLE 31: PHOTOCHEMICAL PRODUCTION OF HYDROGEN FROM WATER WITH SIMULTANEOUS OXIDATION OF SULFITE 0.4 g of the platinum-coated cadmium sulfide (0.8% by weight of Pt) prepared in accordance with Example 1 is suspended in 80 ml of a 10% aqueous solution of sodium sulfite and the suspension is degassed with nitrogen for 45 minutes at 60° C. The resulting suspension is then irradiated at 60° C. in a photoreactor equipped with a Pyrex glass dip finger and a 125 watt high-pressure mercury vapour lamp. The gas evolved is collected in a gasometer. 1,130 ml of gas are evolved in the course of 24 hours (47 ml/hour). No evolution of H$_2$ can be detected in the absence of light.

The quantitative determination of the hydrogen is carried out as follows: 700 ml of the gas obtained are used to hydrogenate at room temperature (20°-25° C.) a solution of 3.0 g of nitrobenzene in 15 ml of methanol using 0.3 g of a Pd-on-charcoal catalyst (5% by weight of Pd). The absorption of hydrogen (=660 ml) is complete after 30 hours. After filtering off the catalyst and evaporating the solvent, the residual yellow oil is found to be a mixture of 68.6% by weight of nitrobenzene and 31.4% by weight of aniline. The consumption of hydrogen calculated from this is 665 ml (at normal pressure and 20° C.).

The hydrogen evolved was thus >90% pure. According to analysis by gas chromatography, the remainder of the gas consists of nitrogen, originating from the previous degassing of the dead space.

The quantitative determination of the residual sulfite is carried out as follows: after exposure, the platinum-coated cadmium sulfide is filtered off from the sulfite solution and the latter is treated with an excess of 0.1N iodine solution and is then back-titrated with 0.1N sodium thiosulfate solution, using starch as indicator. Compared with a blank sample (10% sodium sulfite solution, 24 hours at 60° C. and degassed), a consumption of 0.054 mol of sulfite is observed. The equimolar quantity of hydrogen corresponding to this is 1,301 ml (normal pressure and 20° C.), which agrees approximately with the figures quoted above for the determination of hydrogen.

EXAMPLES 32-65

The examples which follow illustrate the use for the production of hydrogen of further semiconductor powders of the type defined. 80 ml of a 5% aqueous sodium sulfite solution were employed in each case. The remaining reaction conditions and the results are listed in the following table.

TABLE

| Example No. | Catalyst | Reaction temperature °C. | Light source/filter | Evolution of H$_2$ | Remarks |
|---|---|---|---|---|---|
| 32 | 0.4 g of CdS/0.8% by weight of Pt, as described in Example 1 | 60 | 125 Watt high-pressure Hg lamp having a filter with a light transmittance >260 nm | 80 ml/hour | degassed for 45 minutes |
| 33 | 0.7 g of CdS/0.8% by weight of Pt, as described in Example 1 | 60 | 125 Watt high-pressure Hg lamp having a filter with a light transmittance >260 nm | 110 ml/hour | " |
| 34 | 0.4 g of CdS/0.8% by weight of Pt, as described in Example 1 | 60 | 125 Watt high-pressure Hg lamp, 5% by weight of NaNO$_2$ in H$_2$O as filter solution (light transmittance >400 nm) | 30 ml/hour | degassed for 45 minutes, lamp output reduced by 50% as a result of cut-off at 400 nm |
| 35 | 0.4 g of CdS/0.8% by weight of Pt, as described in Example 1 | 40 | 125 Watt high-pressure Hg lamp having a filter as described in Example 32 | 39.5 ml/hour | degassed for 45 minutes |
| 36 | 0.4 g of CdS/0.8% by weight of Pt, as described in Example 1 | 20 | 125 Watt high-pressure Hg lamp having a filter as described in Example 32 | 18 ml/hour | " |
| 37 | 0.4 g of CdS/0.8% by weight of Pt, as described in Example 1 | 60 | 125 Watt high-pressure Hg lamp having a filter as described in Example 32 | 72 ml/hour | not degassed |
| 38 | 0.4 g of CdS/1% by weight of Pt, as described in Example 2 | 60 | 125 Watt high-pressure Hg lamp having a filter as described in Example 32 | 16 ml/hour | degassed for 45 minutes |
| 39 | 0.4 g of CdS/1.33% | 60 | 125 Watt high-pressure | 29 ml/hour | " |

TABLE-continued

| Example No. | Catalyst | Reaction temperature °C. | Light source/filter | Evolution of $H_2$ | Remarks |
|---|---|---|---|---|---|
| | by weight of Au, as described in Example 11 | | Hg lamp having a filter as described in Example 32 | | " |
| 40 | 0.4 g of $TiO_2$/0.84% by weight of Pt, as described in Example 3 | 60 | 125 Watt high-pressure Hg lamp having a filter as described in Example 32 | 12 ml/hour | " |
| 41 | 0.4 g of $TiO_2$/0.044% by weight of Pt, as described in Example 5 | 60 | 125 Watt high-pressure Hg lamp having a filter as described in Example 32 | 14 ml/hour | " |
| 42 | 0.4 g of $TiO_2$/1% by weight of Pt, as described in Example 8 | 60 | 125 Watt high-pressure Hg lamp having a filter as described in Example 32 | 16.5 ml/hour | " |
| 43 | 0.4 g of $TiO_2$/1% by weight of Au, as described in Example 12 | 60 | 125 Watt high-pressure Hg lamp having a filter as described in Example 32 | 2.5 ml/hour | " |
| 44 | 0.4 g of $TiO_2$/0.17% by weight of Pt, as described in Example 4 | 60 | 125 Watt high-pressure Hg lamp having a filter as described in Example 32 | 8.6 ml/hour | " |
| 45 | 0.4 g of $TiO_2$/6.92% by weight of Pt, as described in Example 6 | 60 | 125 Watt high-pressure Hg lamp having a filter as described in Example 32 | 21.1 ml/hour | " |
| 46 | 0.4 g of $TiO_2$/0.05% by weight of Pt, as described in Example 9 | 60 | 125 Watt high-pressure Hg lamp having a filter as described in Example 32 | 7.5 ml/hour | " |
| 47 | 0.04 g of $TiO_2$/1% by weight of Pt, as described in Example 10 | 60 | 125 Watt high-pressure Hg lamp having a filter as described in Example 32 | 35 ml/hour | " |
| 48 | 0.4 g of $TiO_2$/0.6% by weight of Pt, as described in Example 13 | 60 | 125 Watt high-pressure Hg lamp having a filter with a light transmittance >300 nm | 52.5 ml/hour | " |
| 49 | 0.4 g of CdS/1.1% by weight of Pt, as described in Example 14 | 60 | 125 Watt high-pressure Hg lamp having a Pyrex filter; light transmittance >300 nm | 46 ml/hour | |
| 50 | 0.4 g of Cd(S,Se)/1.2% by weight of Pt, as described in Example 15 | 60 | 125 Watt high-pressure Hg lamp having a Pyrex filter; light transmittance >300 nm | 4.5 ml/hour | |
| 51 | 0.4 g of CdS/1.0% by weight of Pt, as described in Example 16 | 60 | 125 Watt high-pressure Hg lamp having a Pyrex filter; light transmittance >300 nm | 82 ml/hour | |
| 52 | 0.4 g of CdS/1.0% by weight of Pt, as described in Example 17 | 60 | 125 Watt high-pressure Hg lamp having a Pyrex filter; light transmittance >300 nm | 82 ml/hour | |
| 53 | 0.4 g of CdS/1.0% by weight of Pt, as described in Example 18 | 60 | 125 Watt high-pressure Hg lamp having a Pyrex filter; light transmittance >300 nm | 69 ml/hour | |
| 54 | 0.4 g of CdS/1.0% by weight of Pt, as described in Example 19 | 60 | 125 Watt high-pressure Hg lamp having a Pyrex filter; light transmittance >300 nm | 54 ml/hour | |
| 55 | 0.4 g of CdS/2.0% by weight of Pd, as described in Example 20 | 60 | 125 Watt high-pressure Hg lamp having a Pyrex filter; light transmittance >300 nm | 24 ml/hour | |
| 56 | 0.4 g of CdS/2.6% by weight of Ag, as described in Example 21 | 60 | 125 Watt high-pressure Hg lamp having a Pyrex filter; light transmittance >300 nm | 14 ml/hour | |
| 57 | 0.4 g of CdS/4% by weight of Rh, as described in Example 22 | 60 | 125 Watt high-pressure Hg lamp having a Pyrex filter; light transmittance >300 nm | 58 ml/hour | coated CdS, after-treated analogously to Example 16 |
| 58 | 0.4 g of CdS/4% by weight of Ir, as described in Example 23 | 60 | 125 Watt high-pressure Hg lamp having a Pyrex filter; light transmittance >300 nm | 18 ml/hour | coated CdS, after-treated analogously to Example 16 |

TABLE-continued

| Example No. | Catalyst | Reaction temperature °C. | Light source/filter | Evolution of $H_2$ | Remarks |
|---|---|---|---|---|---|
| 59 | 0.4 g of CdS/1.15% by weight of Ni, as described in Example 24 | 60 | 125 Watt high-pressure Hg lamp having a Pyrex filter; light transmittance >300 nm | 27 ml/hour | coated CdS, after-treated analogously to Example 16 |
| 60 | 0.4 g of CdS/6.7% by weight of Ag, as described in Example 25 | 60 | 125 Watt high-pressure Hg lamp having a Pyrex filter; light transmittance >300 nm | 21 ml/hour | coated CdS, after-treated analogously to Example 16 |
| 61 | 0.4 g of CdS/5% by weight of Os, as described in Example 26 | 60 | 125 Watt high-pressure Hg lamp having a Pyrex filter; light transmittance >300 nm | 36 ml/hour | coated CdS, after-treated analogously to Example 16 |
| 62 | 0.4 g of CdS/4.5% by weight of Ru, as described in Example 27 | 60 | 125 Watt high-pressure Hg lamp having a Pyrex filter; light transmittance >300 nm | 61 ml/hour | coated CdS, after-treated analogously to Example 16 |
| 63 | 0.4 g of CdS/6.7% by weight of Ag, 0.5% by weight of Pt, as described in Example 29 | 60 | 125 Watt high-pressure Hg lamp having a Pyrex filter; light transmittance >300 nm | 31 ml/hour | |
| 64 | 0.4 g of CdS/1.2% by weight of Ni, 0.5% by weight of Rh, as described in Example 28 | 60 | 125 Watt high-pressure Hg lamp having a Pyrex filter; light transmittance >300 nm | 33 ml/hour | |
| 65 | 0.4 g of CdS/1.0% by weight of Pt, as described in Example 30 | 60 | 125 Watt high-pressure Hg lamp having a Pyrex filter; light transmittance >300 nm | 20 ml/hour | |

EXAMPLE 66

0.4 g of cadmium sulfide (platinum content 1% by weight) coated with platinum in accordance with Example 1 and 0.4 g of cadmium sulfide (platinum content 1% by weight) coated with platinum in accordance with Example 2 are each suspended, analogously to Example 31, in 80 ml of a 2% aqueous solution of $Na_2S$. 9 $H_2O$ and the suspensions are degassed with nitrogen. The resulting suspensions are then irradiated as described in Example 31 (>300 nm). The quantitative determination of the hydrogen formed is also carried out as described in Example 31. The evolution of hydrogen is in each case 30 ml/hour.

What is claimed is:

1. A process for the selective production of hydrogen by means of heterogeneous photoredox catalysts, which comprises reacting mixtures of water and alkali metal sulfites or sulfides, alkaline earth metal sulfites or sulfides or ammonium sulfites or sulfides under the action of light in a suspension of a cadmium sulfide, cadmium sulfoselenide or titanium dioxide/semiconductor powder which is at least partially coated with Cu, Cr, Ni, Co or a noble metal or mixtures thereof.

2. A process according to claim 1, wherein water is used as the suspending agent.

3. A process according to claim 1, wherein an alkali metal sulfite or sulfide or ammonium sulfite or sulfide is used.

4. A process according to claim 1, wherein sodium sulfite or ammonium sulfite is used.

5. A process according to claim 1, wherein the reaction is carried out a temperature between 20° C. and the boiling point of the suspending agent used.

6. A process according to claim 1, wherein the semiconductor powders, of the type defined, which have been coated with the metals, are employed in an amount of 0.05 to 8% by weight, relative to the volume of the reaction.

7. A process according to claim 1, wherein cadmium sulfoselenide/semiconductor or titanium dioxide (anatase modification)/semiconductor powders or, cadmium sulfide/semiconductor powders which are at least partially coated with rhodium, nickel, osmium, ruthenium or nickel/rhodium or silver/platinum mixtures, are used.

8. A process according to claim 1, wherein a cadmium sulfide/semiconductor, cadmium sulfoselenide/semiconductor or titanium dioxide (anatase modification)/semiconductor powder which is at least partially coated with platinum, is used.

* * * * *